May 6, 1969 P. A. BYGDNES 3,443,039

TAPE TRANSPORT SYSTEM WITH STATIONARY HEADS MOUNTED WITHIN A ROTATING STRUCTURE

Filed Jan. 27, 1965

INVENTOR.
PERRY ALAN BYGDNES

BY Gregg & Stidham

ATTORNEYS

United States Patent Office 3,443,039
Patented May 6, 1969

3,443,039

TAPE TRANSPORT SYSTEM WITH STATIONARY HEADS MOUNTED WITHIN A ROTATING STRUCTURE

Perry Alan Bygdnes, 3880 Bret Harte Drive, Redwood City, Calif. 94061

Filed Jan. 27, 1965, Ser. No. 428,340
Int. Cl. G11b 5/10, 5/12; B65h 23/04
U.S. Cl. 179—100.2 10 Claims

ABSTRACT OF THE DISCLOSURE

A tape transport including an idler wheel comprising spaced coaxial discs rotatable on the tape deck. The discs have cylindrical outer surfaces which form a narrow slot between them. The recorder and playback heads are mounted in the slot on a stationary disc which has an arcuate radial protuberance extending into the slot to further support the tape. A mounting block for the stationary discs has side tape guiding surfaces which extend tangentially from the cylindrical surfaces of the rotating discs, and an arcuate concave surface which closely embraces them. A thin cantilever member extends from the concave surface through the slot to support the stationary disc.

This invention relates to a tape transport system and, more particularly, to a closed loop tape transport system wherein tape distortion and vibration are minimized to a negligible quantity.

In many tape transport systems distortion in recording and playback is suffered as a consequence of irregularities in tape feeding mechanisms that cause stretching or slackening of the tape. This defect has been cured to a large extent by development of a closed loop system wherein incoming and outgoing portions of the tape are fed at the same constant rate, and usually by engagement with a common driven capstan. However, in most systems, the tape is fed over a stationary recording or playback unit, and since friction cannot be entirely eliminated, a certain amount of stretching and slackening normally results.

It is, therefore, one object of this invention to provide a tape transport system wherein the effects of tape distortion are minimized.

It is a further object of this invention to provide a tape transport system wherein tape is fed to and past a recording head and playback head assembly without any substantial effects of friction.

Additional defects in existing tape transports reside in the fact that there are generally portions of the tape within the closed loop that are free of contact with guiding surfaces and tend to sag or otherwise deviate from the intended tape path. Moreover, the tape that is unsupported, even over a part of its width, is extremely susceptible to vibrations that produce flutter in reproducing.

It is, therefore, a further object of this invention to provide a tape transport system including an effective device for dampening vibrations that may result from travel of an unsupported span of tape and from frictional engagement of recording and playback heads.

It is a further object of this invention to provide a tape transport system wherein the tape is supported over substantially its entire width, throughout substantially all of its travel between incoming and outgoing engagement with the driving capstan.

In carrying out this invention, I mount the stationary recording head on a stationary disc which is contained within a rotatable idler wheel having a circumferential slot through which the recording head extends. In its preferred form, the supporting disc is, in turn, supported on a thin, flat cantilevered member that extends through the slot from a stationary mounting block secured to the tape deck. The surface of the mounting block from which the cantilever member extends is preferably concave, and formed closely adjacent and concentric to the idler roll. Then, from the extremities of this concave surface, the side surfaces of the guide block extend away from the idler roll in a direction generally tangential thereto and toward the driving capstan in directions generally tangential to it. The other end surface of the guide block is also of arcuate, concave configuration closely to embrace the drive capstan. Since the tangential guide surfaces are closely adjacent to the capstan and to the idler wheel the tape moves from rotating surface virtually without interruption effectively to dampen any vibrations in the tape. Further, since the guide surfaces are tangential there is no deviation in path during these transfers. Moreover the tape is fully supported across its width throughout the loop by reason of the fact that the disc on which the recording head is mounted extends through the circumferential slot to form a continuation of the idler wheel cylindrical surface. Since the idler wheel is rotated by the tape, there is no dynamic friction between the tape and the surface of the wheel and, significantly, the mass of the wheel causes it to act as a flywheel, effectively to dampen high frequency vibrations that are normally produced as the tape traverses to transport system.

Other objects and advantages of this invention will become apparent from the description following, when read in conjunction with the accompanying drawings, wherein.

Figures 1, 2, 3:
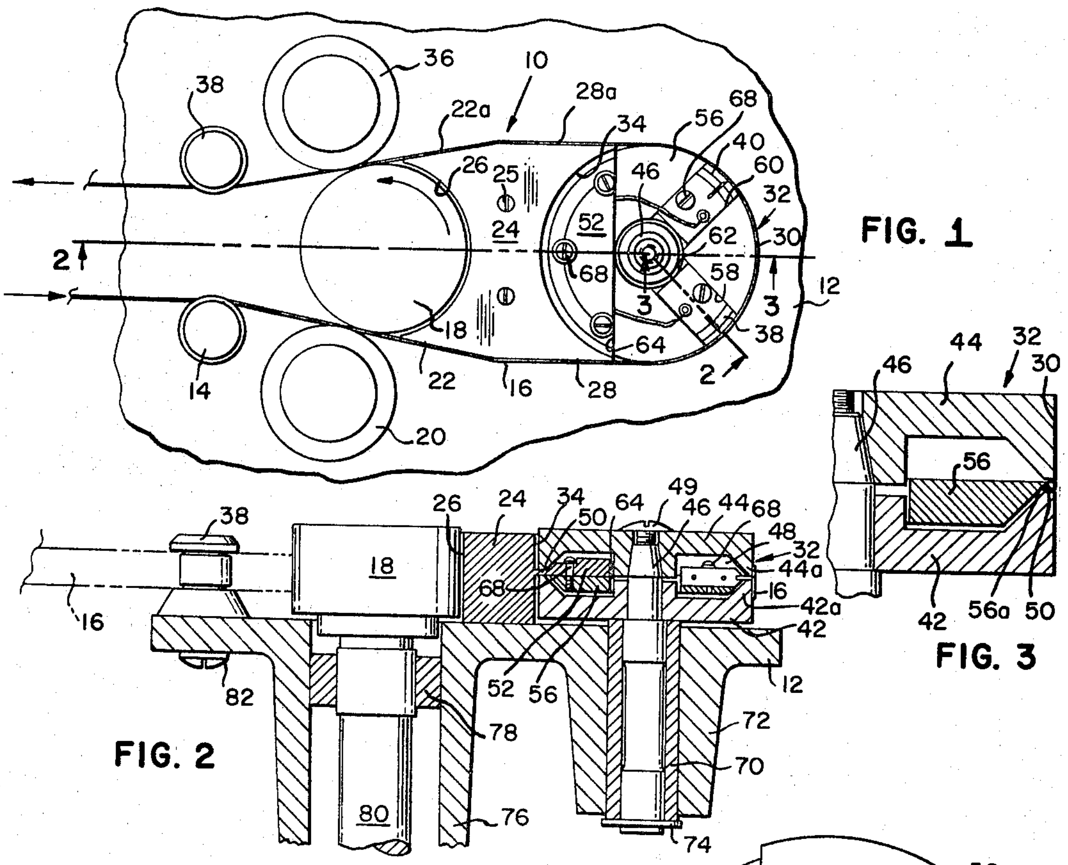
FIG. 1 is a partial plan view of a tape transport system embodying features of my invention.
FIG. 2 is a section view taken along line 2—2 of FIG. 1.
FIG. 3 is a partial section view taken along line 3—3 of FIG. 1.

Referring now to FIG. 1, the tape transport system 10 is mounted on a suitable platform or tape deck 12, and includes a post 14 to guide the incoming tape 16 from a supply reel (not shown) to the driving capstan 18, where it is engaged by a pressure roller 20. From the capstan 18, the tape moves along the surface 22 of a guide block 24 that is secured to the tape deck by screws 25. The surface 22 is tangential to the surface of the capstan 18 at the point from which the tape leaves it, and there is little gap between the surface of the capstan and the guide surface 22 because the capstan is nested within and closely spaced to the concentric concave surface 26 of the guide block. Hence, there is little interruption in tape support.

The tangential guide surface 22 blends smoothly into a second guide surface 28 which is disposed in a direction tangential to the larger cylindrical surface 30 of an idler wheel 32. Again, transfer of the tape 16 from the surface 28 to the cylindrical surface 30 is made almost without interruption of contact by reason of the fact that the idler roll is nested within an arcuate, concave surface 34 of the guide block that is preferably concentric with, and closely adjacent to, the cylindrical surface 30 of the idler 32. The tape actually drives the idler 32 so that there is no dynamic friction between them. Further, the mass of the idler augments the mass of the tape, moving with it effectively to dampen, by the effects of inertia, high frequency vibrations that are commonly produced as the tape traverses the recording and playback heads.

From the idler 32, the tape passes onto a similarly tangential surface **28*a* on the opposite side of the guide block 24 and thence to a surface 22***a* which blends smoothly with it but which is disposed tangentially to the cylindrical surface of the driving capstan 18. Hence, the tape is delivered directly from guide surface 22*a* to the rotating surface of the capstan 18, against which it is pressed by a second pinch roller 36 and thereby driven at the same rate as the incoming portion, being fed onto the guide surface 22. Finally, the tape is delivered to an outgoing guide post 38 and then to the take-up reel (not shown).

Contained within the idler roll 32 are recording and playback magnetic heads 38 and 40 which are fixed to the tape deck 12. Since the magnetic heads are stationary, the tape to head speed is controlled solely by the driving capstan 18. The recording head 38 impresses a lineal track which is immediately detected by the playback head 40 so that the operator can, at all times, monitor the quality of the reproduction.

Referring to FIG. 2, it will be noted that the idler wheel 32 actually comprises a pair of discs 42 and 44 with axially spaced, inwardly directed flanges 42*a* and 44*a*. When the discs are mounted on the rotatable shaft 46, they provide an annular chamber 48 within which the magnetic heads are mounted to extend through the circumferential slot 50 between the inwardly extended flanges 30*a* and 30*b* that together define the cylindrical surface 30. The discs 42 and 44 are mounted to rotate with the shaft as by pressing the lower disc 42 on and by clamping the upper disc 44 against the tapered end of the shaft 46 by means of the screw 49.

Figure 4:
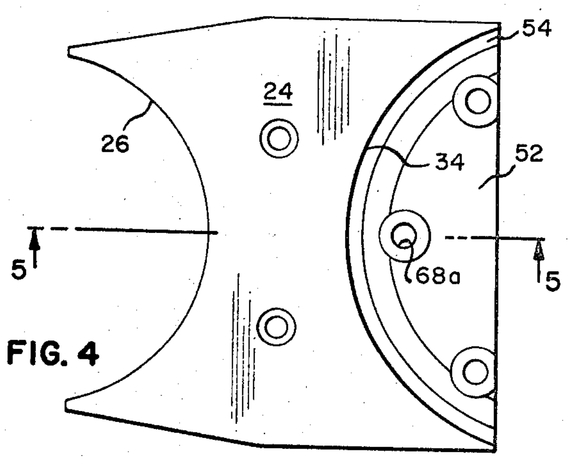
FIG. 4 is a top plan view of a guide block forming a part of my invention.
Figure 5:
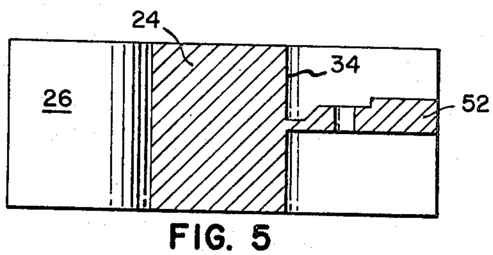
FIG. 5 is a section view along line 4—4 of FIG. 4.

As shown most clearly in FIGS. 4 and 5, a thin chordal cantilever member 52 extends from the arcuate, concave surface of the guide block 24 and, at least along its arcuate juncture 54 with the block 24, the cantilever member is thin enough to fit freely within the slot 50 between the rotating disc flanges 42*a* and 44*a* without contacting either flange. Inwardly of the flanges, the supporting member 52 is preferably of added thickness for strength. It is to be noted that since the thin juncture strip 54 is in the form of an arc, there is no straight line along which bending, and hence deformation, can occur.

Figure 6:
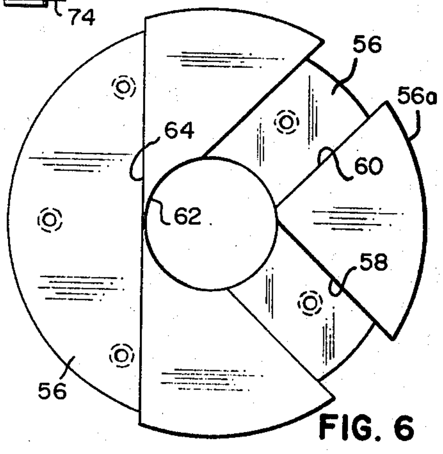
FIGS. 6 and 7 are top and side views, respectively, of a mounting disc.
Figure 7:
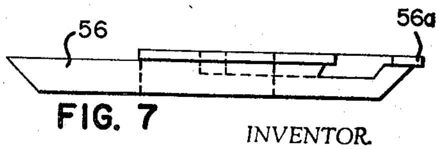

Referring now to FIGS. 1, 6 and 7, a mounting disc 56 of brass or the like is provided with a pair of radial slots 58 and 60 for accommodation of the recording and playback heads 38 and 40. An opening 62 is provided in the center of the disc in order to accommodate the shaft 46 and the hubs of the rotatable idler wheel discs 42 and 44. A segment of the disc is recessed along a chord 64 to mate with the complementary chordal cantilever extension 52 to which it is secured by screws 68. Referring specifically to FIG. 3, a radial flange or extension 56*a* on the mounting disc 56 extends into the slot 50 in the idler wheel 32 and is of a diameter substantially equal to that of the idler wheel so as to form a continuation of the surface 30 for complete transverse support of the tape. If desired, the magnetic heads 38 and 40 may be disposed to extend beyond the surface 30 about one one-thousandth of an inch to insure contact.

In assembling the tape transport 10, the shaft 46 on which the lower disc 42 is firmly pressed, is inserted into the bearing 70 carried in a boss 72, depending from the tape deck 12 and held against removal by a snap ring 74. Then, the mounting disc 56 is secured to the underside of the cantilever extension 52 of the guide block 24 and the guide block is lowered so that the central opening 62 in mounting disc 56 is dropped over the shaft 46 and the hub of the lower disc 42. Then, after the guide block is secured in place by tightening the screws 25, the heads 38 and 40 are secured in the slots 58 and 60 of the mounting disc 56. Finally, the upper rotating disc 42 is dropped over the shaft and the screw 47 tightened to form a unitary, circumferentially divided idler wheel 32 that is free to rotate about the stationary heads 38 and 40 contained therein.

Also as shown in FIG. 2, the driven capstan is rotatably carried within tubular member 76 by any suitable means, such as the bearing sleeve 78 shown, within which is rotatably carried a shaft 80 carrying the capstan 18. Screws or the like secure the guide posts 14 and 38 onto the tape deck 12.

In summary, my tape transport system is a closed-loop system wherein incoming and outgoing portions of the tape 16 are fed by engagement with opposite sides of a capstan 18 to drive the idler wheel so that the tape traverses the recording and playback heads 38 and 40 with the only frictional sliding contact occurring in the area of the circumferential gap 50 where the tape contacts the heads and the radial extension 56*a* of the mounting disc. Intermediate the capstan 18 and the idler wheel 32, the tape 16 is supported by engagement with guide surfaces 22 and 22*a* which extend from a point closely adjacent to the surface of the capstan in a direction tangential thereto and surfaces 28 and 28*a* which extend in a direction tangential to the idler wheel 32 at a point closely adjacent thereto. With the tape 16 supported over virtually all of its travel within the closed loop, tape vibrations are adequately dampened throughout the critical period of its travel. A considerable amount of low frequency flutter is eliminated by the guide surfaces themselves and remaining vibrations are virtually eliminated by the idler wheel 32. That is, a flywheel effect is realized since the mass of the idler augments the mass of the tape moving with it to dampen vibrations by inertia.

While this invention has been described in conjunction with a preferred embodiment thereof, it is apparent that modifications and changes therein may be made by those skilled in the art without departing from the spirit and scope of this invention as defined by the claims appended hereto.

Having described my invention, I claim:

1. A tape transport comprising:
a tape deck,
a wheel comprising a pair of coaxial, axially spaced discs rotatably mounted on said deck,
a cylindrical tape-supporting surface on each of said discs, said discs being disposed so that said cylindrical surfaces are closely axially spaced to form a narrow circumferential slot therebetween,
a stationary magnetic recorder head assembly mounted on said deck and disposed between said discs with a magnetic head thereon extending into said slot to contact a tape on said tape-supporting surface,
a guide block having an arcuate concave surface closely embracing said wheel and a pair of tape-traversing guide surfaces extending in directions generally tangential to said wheel on opposite sides thereof, and
means for driving magnetic tape along said guide surfaces to and from said wheel, respectively,
said magnetic recorder head assembly comprising:
a mounting plate,
a thin rim on said mounting plate of arcuate configuration substantially equal in radius to said cylindrical surfaces and of a thickness to fit within said slot but slightly less than the width thereof, and
means forming a recess in said rim to receive a magnetic head.

2. The tape transport defined by claim 1 including:
means forming at least one generally radial slot in said mounting disc, and
a magnetic recording head secured in said slot,

3. The tape transport defined by claim 2 including:
a thin cantilever member extending from said concave surface on said mounting block through said slot,
means securing said mounting disc to said cantilever extension, and
means securing said mounting block to said tape deck.

4. A tape transport comprising:
a tape deck,
an idler wheel rotatably mounted on said deck,
said wheel comprising a pair of rotatable members having cylindrical surfaces axially spaced to form a circumferential slot therebetween,
means forming a chamber between said rotatable members,
a stationary magnetic recorder head assembly positioned within said chamber with the recorder heads thereon extending through said slot,
a guide block,
an arcuate concave surface on said guide block closely embracing said cylindrical surfaces and a pair of tape traversing guide surfaces on said guide block extending in directions generally tangential to said idler wheel on opposite sides thereof,
means for driving said magnetic tape to and from said cylindrical surface along said tangential guide surfaces,
a thin cantilever member extending from said concave surface through said slot and between said rotatable members, and
means securing said recorder head assembly on said cantilever member.

5. The tape transport defined by claim 4 including:
a driven capstan on said tape deck,
means on said guide block forming a second concave end surface opposite said first end surface partially embracing said capstan and connecting said guide surfaces.

6. The tape transport defined by claim 5 wherein:
said guide surfaces adjacent said second end surfaces extend in directions generally tangential to said capstan.

7. A tape transport comprising:
a tape deck,
a pair of coaxial discs rotatably mounted on said deck to form an idler wheel,
a cylindrical surface on each of said discs for jointly supporting a magnetic tape,
said cylindrical surfaces being closely spaced to form a narrow circumferential slot therebetween,
a support member disposed axially between said discs,
an arcuate extension on said support member of a radius substantially equal to said cylindrical surfaces and of a thickness to extend into said circumferential slot with little clearance,
means forming a generally radial slot in said arcuate extension adapted to receive a recorder head,
a guide block secured to said tape deck,
a pair of guide surfaces on said guide block terminating closely adjacent to said cylindrical surfaces on opposite sides thereof and extending in directions generally tangential to said surfaces,
an arcuate concave surface on said guide block between said guide surfaces adjacent said cylindrical surfaces, and
a thin cantilever member extending from said concave surface on said guide block between said guide surfaces toward and through said circumferential slot,
said support member being mounted on said cantilever member.

8. The tape deck defined by claim 7 wherein:
said surface carrying said cantilever member is coaxial and closely adjacent to said cylindrical surfaces.

9. A tape transport comprising:
a tape deck,
an idler wheel rotatably mounted on said deck,
said wheel comprising a pair of rotatable members having cylindrical surfaces axially spaced to form a circumferential slot therebeween,
means forming a chamber between said rotatable members,
a stationary magnetic recorder head assembly mounted on said tape deck and positioned within said chamber with the recorder heads thereon extending through said slot,
a guide block,
an arcuate concave surface on said guide block closely embracing said cylindrical surfaces and a pair of tape traversing guide surfaces on said guide block extending in directions generally tangential to said idler wheel on opposite sides thereof,
means for driving said magnetic tape to and from said said cylindrical surfaces along said tangential guide surfaces,
said recorder head assembly comprising:
a disc,
a radial extension on said disc of a radius equal to said cylindrical surfaces and of a thickness to fit into said slot,
means securing a magnetic recorder head in said head-accommodating slot to extend into said circumferential slot.

10. The tape transport defined by claim 5 including:
a driven capstan on said tape deck,
means on said guide block forming a second concave end surface opposite said first end surface partially embracing said capstan and connecting said guide surfaces.

References Cited

UNITED STATES PATENTS

| | | | |
|---|---|---|---|
| 2,970,732 | 2/1961 | Lawrence | 226—196 |
| 2,735,900 | 2/1956 | Wohlrab | 179—100.2 |
| 3,005,582 | 10/1961 | Brede | 179—100.2 |
| 3,283,068 | 11/1966 | Urry | 179—100.2 |

BERNARD KONICK, *Primary Examiner.*

J. RUSSELL GOUDEAU, *Assistant Examiner.*

U.S. Cl. X.R.

226—196